US010714143B2

(12) United States Patent
Rodriguez et al.

(10) Patent No.: US 10,714,143 B2
(45) Date of Patent: Jul. 14, 2020

(54) DISTINGUISHING HEVC PICTURES FOR TRICK MODE OPERATIONS

(71) Applicant: Cisco Technology, Inc., San Jose, CA (US)

(72) Inventors: Arturo A. Rodriguez, Norcross, GA (US); Kevin Alistair Murray, Hampshire (GB); Scott Christopher Labrozzi, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/186,020

(22) Filed: Nov. 9, 2018

(65) Prior Publication Data

US 2019/0080717 A1 Mar. 14, 2019

Related U.S. Application Data

(62) Division of application No. 15/488,584, filed on Apr. 17, 2017, now Pat. No. 10,141,021, which is a
(Continued)

(51) Int. Cl.
| | |
|---|---|
| *H04N 5/77* | (2006.01) |
| *H04N 9/80* | (2006.01) |
| *G11B 27/00* | (2006.01) |
| *H04N 5/783* | (2006.01) |
| *H04N 19/70* | (2014.01) |
| *H04N 21/432* | (2011.01) |
| *H04N 21/434* | (2011.01) |
| *H04N 21/6332* | (2011.01) |
| *H04N 21/845* | (2011.01) |
| *G11B 27/30* | (2006.01) |
| *H04N 21/472* | (2011.01) |

(Continued)

(52) U.S. Cl.
CPC ............ *G11B 27/005* (2013.01); *G11B 27/30* (2013.01); *H04N 5/783* (2013.01); *H04N 19/70* (2014.11); *H04N 21/4325* (2013.01); *H04N 21/4348* (2013.01); *H04N 21/47217* (2013.01); *H04N 21/6332* (2013.01); *H04N 21/8451* (2013.01); *H04N 21/8453* (2013.01)

(58) Field of Classification Search
USPC ....... 386/343, 344, 345, 346, 347, 348, 349, 386/326, 330, 331, 335
See application file for complete search history.

(56) References Cited

U.S. PATENT DOCUMENTS

| | | | |
|---|---|---|---|
| 9,627,001 B2 | 4/2017 | Rodriguez et al. | |
| 2009/0310934 A1* | 12/2009 | Rodriguez | H04N 5/76 386/343 |

(Continued)

OTHER PUBLICATIONS

Rejection Decision issued in Chinese Patent Application No. 201480047695.7 dated Jan. 11, 2019, 26 pages.
(Continued)

*Primary Examiner* — Daquan Zhao
(74) *Attorney, Agent, or Firm* — Merchant & Gould P.C.

(57) ABSTRACT

Assistance information related to a tier framework may describe signaling for extractable and decodable sub-sequences based on pictures interdependencies. This may allow a video application to efficiently select pictures when performing a given trick mode.

20 Claims, 4 Drawing Sheets

Related U.S. Application Data division of application No. 14/472,251, filed on Aug. 28, 2014, now Pat. No. 9,627,001.

(60) Provisional application No. 61/871,290, filed on Aug. 28, 2013.

(51) Int. Cl.
*H04N 5/932* (2006.01)
*H04N 5/765* (2006.01)

(56) References Cited

U.S. PATENT DOCUMENTS

| | | |
|---|---|---|
| 2010/0215338 A1 | 8/2010 | Rodriguez |
| 2013/0308926 A1* | 11/2013 | Jang ................. H04N 5/783 386/344 |
| 2015/0063790 A1 | 3/2015 | Rodriguez et al. |

OTHER PUBLICATIONS

International Search Report & Written Opinion cited in International Application No. PCT/US2014/053234 dated Nov. 10, 2014, 16 pgs.

"Digital Video Broadcasting (DVB); Specification for the use of Video and Audio Coding in Broadcasting Applications based on the MPEG-2 Transport Stream", Technical Specification, European Telecommunications Standards Institute (ETSI), 650, Route Des Lucioles; F-06921 Sophia-Antipolis; France, vol. BROADCAS, No. V1.11.1, Nov. 30, 2012 (Nov. 30, 2012), XP014092645, Paragraph D.3, "PVR assistance"; p. 157-p. 167.

"High efficiency video coding; H.265 (Apr. 2013)", ITU-T Standard, International Telecommunication Union, Geneva; CH, No. H.265 (Apr. 2013), Apr. 13, 2013 (Apr. 13, 2013), pp. 1-317, XP017578238, [retrieved on Jun. 6, 2013] cited in the application Paragraph 3.28, p. 5; Paragraph 7.4.2.4.3, p. 59; Paragraph 8.1, p. 93.

Second Office Action issued in Chinese Patent Application No. 201480047695.7 dated Jul. 11, 2018, 10 pgs.

Office Action issued in European Patent Application No. 14766072.4-1230 dated Nov. 8, 2019, 2 pages.

* cited by examiner

DISTINGUISHING HEVC PICTURES FOR TRICK MODE OPERATIONS

RELATED APPLICATIONS

This application is a Division of co-pending U.S. application Ser. No. 15/488,584 entitled "Distinguishing HEVC Pictures for Trick Mode Operations" filed Apr. 17, 2017, (U.S. Pat. No. 10,141,021, Nov. 27, 2018) which is a Division of U.S. application Ser. No. 14/472,251 (U.S. Pat. No. 9,627,001, Apr. 18, 2017) entitled "Support for Trick Modes in HEVC Streams" filed Aug. 28, 2014, which claims the benefit under provisions of 35 U.S.C. § 119(e) of U.S. Provisional Application No. 61/871,290 filed Aug. 28, 2013, which are incorporated herein by reference.

TECHNICAL FIELD

This disclosure relates in general to processing of video signals, and more particularly, to supporting trick mode functionality in HEVC streams.

BACKGROUND

Trick modes, also known as video playback modes other than the normal playback mode intended for a video program may be desirable for a user that wishes to implement modes such as fast forward playback, fast reverse playback, slow forward playback, slow reverse playback, forward frame (or picture) stepping, reverse frame (or picture) stepping, and pause. Coupled with random access that enables entry at points of a coded video stream where a decoder can start decoding the coded video stream (referred to herein as a bitstream), trick modes may be supported for applications such as personal video recording ("PVR"), digital video recording ("DVR"), and video on demand ("VOD"). There exists a need in High Efficiency Video Coding ("HEVC") bitstreams to provide assistance information to help applications affectuate requested trick modes.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION OF EXAMPLE EMBODIMENTS

Overview

Figure 1:
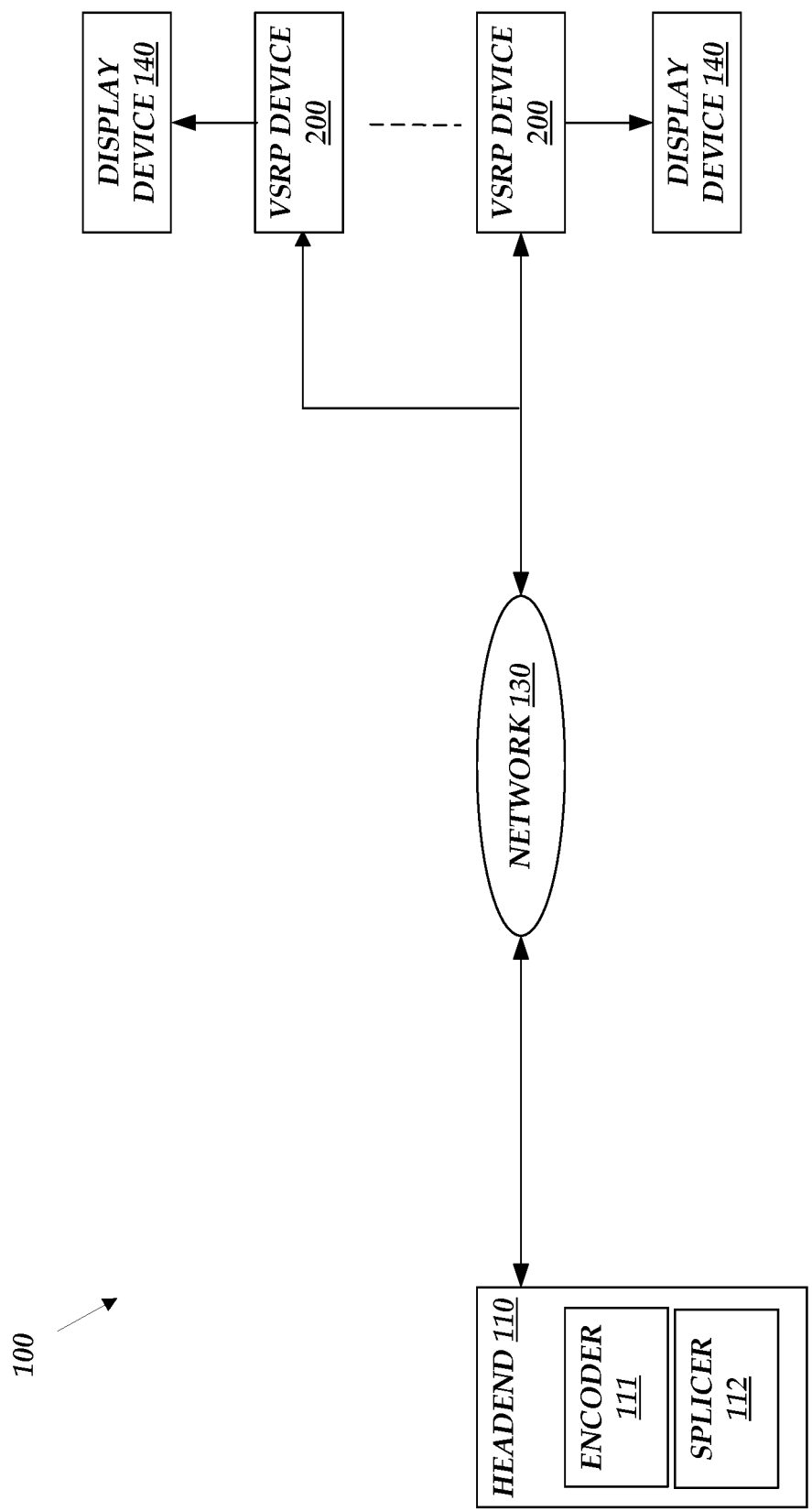
FIG. 1 is a block diagram that illustrates an example environment in which video processing (VP) systems and methods may be implemented.

In one method embodiment, a receive-and-process (VSRP) device may receive a bitstream of successive coded pictures and assistance information that respectively corresponds to each consecutive portion of the successive coded pictures of the bitstream. A user may request trick mode functionality via a user input interface and input device such as a keyboard or a remote control.

Assistance information may include signals or messages that pertain to information that provisions trick modes and random access in data fields of the transport stream that carries an elementary stream corresponding to a video program. For example, the transport stream can be a MPEG-2 transport stream as specified in ISO/IEC 13818-1, (2007), "Information Technology—Generic coding of moving pictures and associated audio—Part 1: Systems," which is incorporated in its entirety herein by reference. This information that provisions trick modes is referred throughout herein as "assistance information". Embodiments of the present disclosure pertain to video streams that correspond to picture sequences that have been coded according to the HEVC video coding specification, specified by ITU-T Rec H.265|ISO/IEC 23008-2—MPEG-H Part 2: High Efficiency Video Coding, which is incorporated in its entirety herein by reference.

The assistance information may be used to signal information with the aim of helping applications, such as PVR and VOD, to perform trick-play operations but does not mandate any specific PVR device behavior. Rather the application or receiving device (or processing device that processes the bitstream in a receiver) may affect a certain behavior of trick mode based on the assistance information.

EXAMPLE EMBODIMENTS

Disclosed herein are various example embodiments of video processing (VP) systems and methods (collectively, referred to herein also as a VP system or VP systems) that convey and process assistance information delivered in, corresponding to, or associated with, a bitstream. In one embodiment, responsive to user input the video stream receive-and-process (VSRP) device may affect a certain behavior of trick mode based on the assistance information.

In some embodiments, assistance information may only be present to coincide at the start of each video access unit. For example, assistance information may be carried in the Adaptation Field of an MPEG-2 transport packet, which is in non-encrypted form. The assistance information corresponding to a respective first coded picture of a bitstream is specifically provided in the Adaptation Field of the transport packet that contains in its payload the start of the first coded picture. Some embodiments of this disclosure contemplate that the assistance information may be carried or provided separately from the bitstream containing the video program. Certain embodiments may associate the separate assistance information with the HEVC frames to ensure synchronization of the assistance information.

In some embodiments, assistance information may be expressed by a value, such as "PVR_assist_tier_pic_num." The value pertains to picture interdependencies with successive tier numbers, such that if decoding starts at a random access point ("RAP") of the bitstream when the bitstream corresponds to the HEVC compressed version of the respective picture sequence of a video program, a self-decodable sub-stream may be extracted. In one embodiment, the self-decodable sub-stream may contain non-decodable leading pictures in accordance with the HEVC specification and the extracted self-decodable sub-stream comprises of pictures that do not include non-decodable leading pictures. In an alternate embodiment, the extracted self-decodable substream includes pictures corresponding only to intra pictures and trailing pictures in accordance with the HEVC specification. In yet another embodiment, the extracted self-decodable sub-stream includes pictures corresponding only to intra pictures, trailing pictures, and decodable leading pictures in accordance with the HEVC specification.

In some embodiments, a flag in the assistance information may signal to an application or VRSP device of the bitstream to disable or block trick modes over a corresponding segment or portion of the bitstream in which the flag is effective. When trick modes are blocked over a segment comprising of successive RAPs, the flag may be signaled at each RAP over the duration of the segment to maintain its persistence. Each respective portion or segment where trick modes are disabled or blocked may be processed only in normal playback mode by the application or VRSP device. In one embodiment, trick modes may be disabled for certain commercials or advertisements, such as for particular commercial or adverts that have obtained blocking rights (e.g., a commercial provider may pay a certain fee to an operator or broadcaster for such rights). As a non-limiting example, the flag pvr_assist_block_trick_mode_present_flag may signal the presence of a blocking trick modes signal.

In one embodiment, a packetized elementary stream ("PES") packet, as specified in MPEG-2 Transport, may be constrained to contain no more than one video access unit ("AU") start, where the AU is as specified in the HEVC specification referenced above. That is, the constraint is that there be no more than one video access unit (AU) start per PES packet. In other words each PES packet may contain exactly one AU. In yet another embodiment, the first payload byte after the PES header may be the start of the AU. A "data_alignment_indicator" in the PES header shall be set to a value of "1" to indicate such a data alignment.

To facilitate random access periodically without introducing excessive channel change time in TV networks, the maximum time interval between successive RAP pictures may be limited to maximum duration in number of pictures or less than or equal to a certain amount of time. For example, a time may be set close to a 1.0 second plus a delta of time to facilitate scene change adjustments in video coding or efficient video coding with group of pictures ("GOP") structures that are powers of two or multiples of two. The maximum duration in number of pictures between successive RAPs may be the multiple of eight number that is closest to one second in accordance with the number of frames per second corresponding to the picture sequence in the bitstream.

In some embodiments, a RAP AU may include exactly one Video Parameter Set ("VPS"), one active Sequence Parameter Set ("SPS") containing Video Usability Information ("VUI"), and at least one or more Picture Parameter Sets ("PPS"), each required for decoding one or more pictures respectively associated with a corresponding PPS. The SPS may precede any Supplemental Enhancement Information ("SEI"). The respective parameter set and information types are identified by specific types of Network Abstraction Layer units in accordance with the HEVC specification.

In some embodiments, any prefix SEI NAL units (as specified in the HEVC specification) associated with an AU may precede the NAL unit corresponding to the first coded slice of the AU. Similarly, any suffix SEI NAL units (as specified in the HEVC specification) associated with the AU may precede the NAL unit corresponding to the last coded slice of the AU.

A RAP picture associated with a RAP of the bitstream may correspond to Instantaneous Decoding Refresh ("IDR"), Clean Random Access ("CRA"), or Broken Link Access ("BLA"), where IDR, CRA, BLA are specified by the HEVC specification. All the Video Coding Layer ("VCL") NAL units of a RAP picture may have the same unit type (nal_unit_type). The RAP picture associated with a picture in the bitstream (i.e., the picture's associated RAP picture) may be defined as the closest prior RAP picture in the bitstream (i.e., the preceding RAP in decode order).

When the decoding of an HEVC bitstream starts at a RAP picture that is a BLA picture with a NAL unit type equal to BLA_W_LP or a CRA picture with NAL unit type equal to CRA_NUT, any picture that immediately follows the RAP picture that is a Random Access Skipped Leading ("RASL") picture may not be decodable by the HEVC decoder as a RASL picture may contain references to pictures that are not present in the bitstream (i.e., references to pictures that were in the bitstream prior to the associated RAP picture).

Thus, when the decoding of an HEVC bitstream starts at a RAP picture that is a BLA picture with NAL unit type equal to BLA_W_LP or a CRA picture with NAL unit type equal to CRA_NUT, RASL pictures associated with the RAP picture are not decodable. Furthermore, when the decoding of an HEVC bitstream starts at a RAP picture with a NAL unit type equal to CRA_NUT, the value of a flag (such as HandleCraAsBlaFlag) may be set equal to 1 and a variable (such as NoRaslOutputFlag) may be set equal to the value of the flag.

Assistance information related to a tier framework may describe signaling for extractable and decodable sub-sequences based on pictures interdependencies. This may allow a video application to efficiently select pictures when performing a given trick mode.

In some embodiments, a hierarchy of data dependency tiers may contain at most N tiers. In one embodiment, N=7. The tiers may be ordered successively from "0" to "N", where N is less than or equal to "7" (or in a different embodiment: 0 to N) based on their respective decodability so that any picture with a particular tier number does not depend directly or indirectly on any picture with a higher tier number.

Each picture in the video stream may belong to one of the N tiers, such that N is less than or equal to 8. For any value of k=0, . . . N, any picture in the kth tier may not depend directly or indirectly on the processing or decoding of any picture in the (k+1) th tier or above. This implies that a picture that depends on a reference picture may not have a tier number smaller than the tier number of the reference picture.

A lowest tier number may consist of the first level of picture extractability, and each subsequent tier may correspond to the next level of picture extractability in the video stream and it includes all the pictures with a lower tier number. In some embodiments, all RAP pictures belong to Tier 0 and all Tier 0 pictures must be RAP pictures. A certain tier, such as Tier 5 in one embodiment, may be assigned to the largest tier number that may be assigned to reference pictures that are intended to be extracted for trick modes. The tiers above the certain tier, such as in this case, Tiers 6 and 7, correspond to the last level of picture extractability (highest tiers) and correspond to pictures deemed discardable, which are pictures that are not used as reference pictures. In this example, Tiers 6 and 7 pictures are intended to be discardable for trick-mode purposes and do not depend on other Tier 6 and 7 pictures.

In some embodiments for HEVC bitstreams, all pictures that are not reference pictures belong to Tier 7 in one embodiment. In alternate embodiments, all pictures that are not reference pictures may belong to Tier 7 or Tier 6.

When video decoding of an HEVC bitstream starts at a RAP, starting from a RAP picture and including the RAP picture, for any value of k=0, . . . 7, except for Tier k picture that is a RASL picture (in accordance with the HEVC specification), a Tier k picture associated with the RAP picture is decodable if all immediately-preceding Tier 0 through Tier k pictures, inclusive, in the video stream have been decoded. Specifically, when video decoding of an HEVC bitstream starts at a RAP picture with a nal_unit_type equal to BLA_W_LP or CRA_NUT, each of the RASL pictures associated with the RAP picture, if present, are not decodable irrespective of the Tier number associated with the picture.

A RASL picture may have nal_unit_type equal to RASL_R (i.e., be a reference picture) or RASL_N (i.e., not be a reference picture, as specified in the HEVC specification. Irrespective of the Tier number, all RASL picture that are not decodable when video decoding of an HEVC bitstream starts at a RAP picture with nal_unit_type equals to BLA_W_LP or CRA_NUT. If the RAP picture is a CRA, the value of a flag variable (HandleCraAsBlaFlag) shall be equal to 1 and a variable (NoRaslOutputFlag) shall be set equal to the flag value.

Per the HEVC specification, the value of "nuh_temporal_id_plus1 minus 1" in the NAL unit header of each NAL unit in an AU specifies a temporal identifier for the NAL unit. The value of nuh_temporal_id_plus1 shall not be equal to 0. The TemporalId of a picture is derived as follows: TemporalId=nuh_temporal_id_plus1−1.

The TemporalId of each RAP picture is equal to 0. In some embodiments, a picture that is not a RAP picture may also have TemporalId equal to 0. The maximum TemporalId value that a picture can have is equal to the value of "sps_max_sub_layers_minus1", which may be provided in the active SPS, per the HEVC specification.

In embodiments of the present disclosure, all the tier number corresponding to a picture and specified in its corresponding transport packet, shall be according to the following:

All Intra Random Access Point ("IRAP") pictures have a tier equal to the lowest tier number (e.g., 0 in one embodiment, or 1 in an alternate embodiment).

All pictures with a TemporalId value equal to 0 that are not RAP pictures may have a tier value equal to one more than the tier number (i.e., tier value) corresponding to the RAP pictures.

When the tier number corresponding to RAP pictures is equal to zero, All pictures with a TemporalId value greater than 0 will have a tier value equal to the reference picture's TemporalId plus 1.

The maximum tier number corresponding to a picture in the bitstream will be according to a picture corresponding to the maximum TemporalId according to the sps_max_sub_layers_minus1 provided in the SPS. The maximum tier number that a picture may have is a value equal to 7 (the highest tier).

In other embodiments of the present disclosure, the tier number corresponding to a picture shall be according to the following:

All IRAP pictures have a tier equal to 0.

All pictures with a TemporalId value equal to 0 that are not RAP pictures have a tier equal to 1.

All reference pictures with a TemporalId value greater than 0 have a tier equal to the TemporalId plus 1.

In an alternate embodiment, all non-reference pictures with a TemporalId value equal to sps_max_sub_layers_minus1 may have a tier value equal to 7. It should be understood that in embodiments of HEVC, "6" is the maximum TemporalId value. The range of TemporalId values employed in embodiments of the present disclosure may range from 0 to 6, but the high end of the range is not required to be 6. For example, discardable picture may end up with a TemporalId of 3 or 4 depending upon the coding strategy employed.

It should be further understood that a TemporalId of 0 may not be solely limited to RAP pictures. In some embodiments, a TemporalId of 0 may be split into two tiers. For example, a TemporalId of 0 for RAP pictures may be mapped to a tier=0. Alternatively, a TemporalId of 0 for non-RAP pictures, may result in mapping the pictures to a tier=1 (for either intra or non-intra pictures). For all other values of TemporalId, the mapped tier value may be TemporalId+1. While current implementations of Digital Video Broadcasting ("DVB") standards do not support gaps in the tier numbers, the present disclosure contemplates that such gaps may be present.

These and/or other features and embodiments are described hereinafter in the context of an example subscriber television system environment, with the understanding that other multi-media (e.g., video, graphics, audio, and/or data) environments, including Internet Protocol Television (IPTV) network environments, cellular phone environments, and/or hybrids of these and/or other networks, may also benefit from certain embodiments of the VP systems and methods and hence are contemplated to be within the scope of the disclosure. It should be understood by one having ordinary skill in the art that, though specifics for one or more embodiments are disclosed herein, such specifics as described are not necessarily part of every embodiment.

FIG. 1 is a high-level block diagram depicting an example environment in which one or more embodiments of a VP system are implemented. In particular, FIG. 1 is a block diagram that depicts an example subscriber television system (STS) 100. In this example, the STS 100 includes a headend 110 and one or more video stream receive-and-process (VSRP) devices 200. In some embodiments, one of the VSRP devices 200 may be equipped with functionality to process assistance information that affects proper trick mode functionality.

The VSRP devices 200 and the headend 110 are coupled via a network 130. The headend 110 and the VSRP devices 200 cooperate to provide a user with television services, including, for example, broadcast television programming, interactive program guide (IPG) services, VOD services, PVR services, DVR services, and pay-per-view, as well as other digital services such as music, Internet access, commerce (e.g., home-shopping), voice-over-IP (VOIP), and/or other telephone or data services.

The VSRP device 200 is typically situated at a user's residence or place of business and may be a stand-alone unit or integrated into another device such as, for example, the display device 140, a personal computer, personal digital assistant (PDA), mobile phone, among other devices. In other words, the VSRP device 200 (also referred to herein as a digital receiver or processing device or digital home communications terminal (DHCT)) may comprise one of many devices or a combination of devices, such as a set-top box, television with communication capabilities, cellular phone, personal digital assistant (PDA), or other computer or computer-based device or system, such as a laptop, personal computer, DVD/CD recorder, among others. As set forth above, the VSRP device 200 may be coupled to the display device 140 (e.g., computer monitor, television set, etc.), or in some embodiments, may comprise an integrated display (with or without an integrated audio component).

The VSRP device 200 receives signals (video, audio and/or other data) including, for example, digital video signals in a compressed representation of a digitized video signal such as, for example, a composite video signal ("CVS") modulated on a carrier signal, and/or analog information modulated on a carrier signal, among others, from the headend 110 through the network 130, and provides reverse information to the headend 110 through the network 130.

Television services may be presented via respective display devices 140, each which typically comprises a television set. However, the display devices 140 may also be any other device capable of displaying the sequence of pictures of a video signal including, for example, a computer monitor, a mobile phone, game device, etc. In one implementation, the display device 140 is configured with an audio component (e.g., speakers), whereas in some implementations, audio functionality may be provided by a device that is separate yet communicatively coupled to the display device 140 and/or VSRP device 200. Although shown communicating with a display device 140, the VSRP device 200 may communicate with other devices that receive, store, and/or process bitstreams from the VSRP device 200, or that provide or transmit bitstreams or uncompressed video signals to the VSRP device 200.

The network 130 may comprise a single network, or a combination of networks (e.g., local and/or wide area networks). Further, the communications medium of the network 130 may comprise a wired connection or wireless connection (e.g., satellite, terrestrial, wireless LAN, etc.), or a combination of both. In the case of wired implementations, the network 130 may comprise a hybrid-fiber coaxial (HFC) medium, coaxial, optical, twisted pair, etc. Other networks are contemplated to be within the scope of the disclosure, including networks that use packets incorporated with and/or are compliant to MPEG-2 transport with HEVC coding or other transport layers or coding protocols.

The headend 110 may include one or more server devices (not shown) for providing video, audio, and other types of media or data to client devices such as, for example, the VSRP device 200. The headend 110 may receive content from sources external to the headend 110 or STS 100 via a wired and/or wireless connection (e.g., satellite or terrestrial network), such as from content providers, and in some embodiments, may receive package-selected national or regional content with local programming (e.g., including local advertising) for delivery to subscribers. The headend 110 also includes one or more encoders (encoding devices or compression engines) 111 (one shown) and one or more video processing devices embodied as one or more splicers 112 (one shown) coupled to the encoder 111. In some embodiments, the encoder 111 and splicer 112 may be co-located in the same device and/or in the same locale (e.g., both in the headend 110 or elsewhere), while in some embodiments, the encoder 111 and splicer 112 may be distributed among different locations within the STS 100. For instance, though shown residing at the headend 110, the encoder 111 and/or splicer 112 may reside in some embodiments at other locations such as a hub or node. The encoder 111 and splicer 112 are coupled with suitable signaling or provisioned to respond to signaling for portions of a video service where commercials are to be inserted.

The encoder 111 provides a compressed bitstream (e.g., in a transport stream) to the splicer 112 while both receive signals or cues that pertain to splicing or digital program insertion. In some embodiments, the encoder 111 does not receive these signals or cues. In one embodiment, the encoder 111 and/or splicer 112 are further configured to provide assistance information corresponding tier numbers and other information in the bitstream to convey to the VSRP devices 200 instructions corresponding to affect extraction of pictures for trick mode operation as previously described.

Further, the splicer 112 may pass the assistance information provided by the encoder 111, with or without modification, to the VSRP device 200, or the encoder 111 may provide the assistance information directly (bypassing the splicer 112) to the VSRP device 200.

The STS 100 may comprise an IPTV network, a cable television network, a satellite television network, a subscriber network, or a combination of two or more of these networks or other networks. Further, network PVR and switched digital video are also considered within the scope of the disclosure. Although described in the context of video processing, it should be understood that certain embodiments of the VP systems described herein also include functionality for the processing of other media content such as compressed audio streams.

The STS 100 comprises additional components and/or facilities not shown, as should be understood by one having ordinary skill in the art. For instance, the STS 100 may comprise one or more additional servers (Internet Service Provider (ISP) facility servers, private servers, on-demand servers, channel change servers, multi-media messaging servers, program guide servers), modulators (e.g., QAM, QPSK, etc.), routers, bridges, gateways, multiplexers, transmitters, and/or switches (e.g., at the network edge, among other locations) that process and deliver and/or forward (e.g., route) various digital services to subscribers.

In one embodiment, the VP system comprises the headend 110 and one or more of the VSRP devices 200. In some embodiments, the VP system comprises portions of each of these components, or in some embodiments, one of these components or a subset thereof. In some embodiments, one or more additional components described above yet not shown in FIG. 1 may be incorporated in a VP system, as should be understood by one having ordinary skill in the art in the context of the present disclosure.

Figure 2:
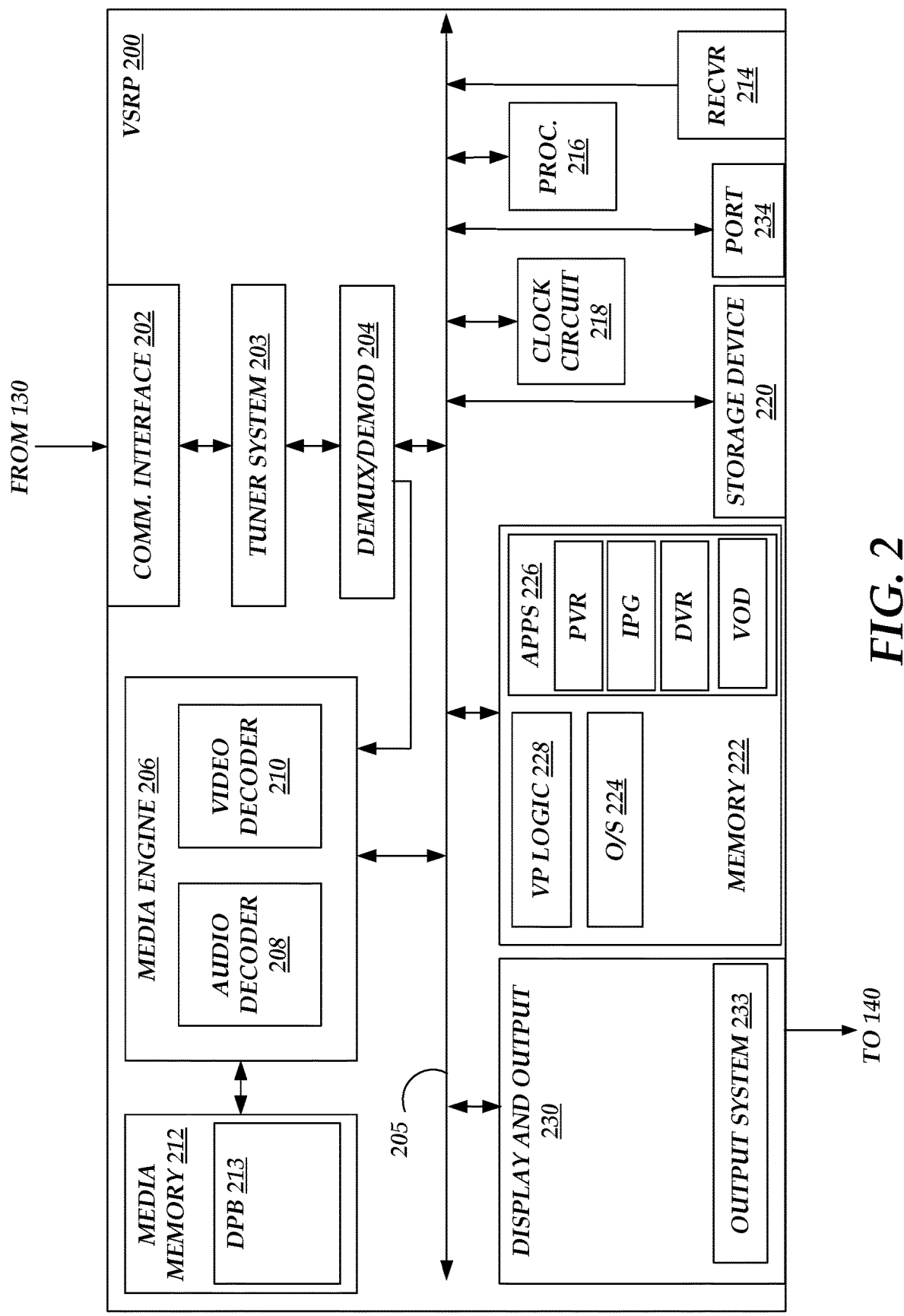
FIG. 2 is a block diagram of an example embodiment of a video stream receive-and-process (VSRP) device comprising an embodiment of a VP system.

FIG. 2 is an example embodiment of select components of a VSRP device 200. It should be understood by one having ordinary skill in the art that the VSRP device 200 shown in FIG. 2 is merely illustrative, and should not be construed as implying any limitations upon the scope of the disclosure. In one embodiment, a VP system may comprise all components shown in, or described in association with, the VSRP device 200 of FIG. 2. In some embodiments, a VP system may comprise fewer components, such as those limited to facilitating and implementing the decoding of compressed bitstreams and/or output pictures corresponding to decoded versions of coded pictures in the bitstream. In some embodiments, functionality of the VP system may be distributed among the VSRP device 200 and one or more additional devices as mentioned above.

The VSRP device 200 includes a communication interface 202 (e.g., depending on the implementation, suitable for coupling to the Internet, a coaxial cable network, an HFC network, satellite network, terrestrial network, cellular network, etc.) coupled in one embodiment to a tuner system 203. The tuner system 203 includes one or more tuners for receiving downloaded (or transmitted) media content. The tuner system 203 can select from a plurality of transmission signals provided by the STS 100 (FIG. 1). The tuner system 203 enables the VSRP device 200 to tune to downstream media and data transmissions, thereby allowing a user to receive digital media content via the STS 100. The tuner system 203 includes, in one implementation, an out-of-band tuner for bi-directional data communication and one or more tuners (in-band) for receiving television signals. In some embodiments (e.g., IPTV-configured VSRP devices), the tuner system may be omitted.

The tuner system 203 is coupled to a demultiplexing/demodulation system 204 (herein, simply demux 204 for brevity). The demux 204 may include MPEG-2 transport demultiplexing capabilities. When tuned to carrier frequencies carrying a digital transmission signal, the demux 204 enables the separation of packets of data, corresponding to the desired video stream, for further processing. Concurrently, the demux 204 precludes further processing of packets in the multiplexed transport stream that are irrelevant or not desired, such as packets of data corresponding to other bitstreams. Parsing capabilities of the demux 204 allow for the ingesting by the VSRP device 200 of program associated information carried in the bitstream. The demux 204 is configured to identify and extract information in the bitstream, such as assistance information, to facilitate the identification, extraction, and processing of the coded pictures. Other such information includes Program Specific Information (PSI) (e.g., Program Map Table (PMT), Program Association Table (PAT), etc.) and parameters or syntactic elements (e.g., Program Clock Reference (PCR), time stamp information, payload_unit_start_indicator, etc.) of the transport stream (including packetized elementary stream (PES) packet information).

In one embodiment, additional information extracted by the demux 204 includes the aforementioned assistance information pertaining to the bitstream that assists the decoding logic (in cooperation with the processor 216 executing code of the VP logic 228) to affect certain behavior to provide the requested trick mode, wherein the assistance information pertains to picture interdependencies related by successive tier numbers, and in some embodiments, further assists display and output logic 230 (in cooperation with the processor 216 executing code of the VP logic 228) in processing reconstructed pictures for display and/or output.

The demux 204 is coupled to a bus 205 and to a media engine 206. The media engine 206 comprises, in one embodiment, decoding logic comprising one or more of a respective audio decoder 208 and video decoder 210. The media engine 206 is further coupled to the bus 205 and to media memory 212, the latter which, in one embodiment, comprises one or more respective buffers for temporarily storing compressed (compressed picture buffer or bit buffer, not shown) and/or reconstructed pictures (decoded picture buffer or DPB 213). In some embodiments, one or more of the buffers of the media memory 212 may reside in other memory (e.g., memory 222, explained below) or components.

The VSRP device 200 further comprises additional components coupled to the bus 205 (though shown as a single bus, one or more buses are contemplated to be within the scope of the embodiments). For instance, the VSRP device 200 further comprises a receiver 214 (e.g., infrared (IR), radio frequency (RF), etc.) configured to receive user input (e.g., via direct-physical or wireless connection via a keyboard, remote control, voice activation, etc.) to convey a user's request or command (e.g., for program selection, trick mode manipulation such as fast forward, rewind, pause, channel change, one or more processors (one shown) 216 for controlling operations of the VSRP device 200, and a clock circuit 218 comprising phase and/or frequency locked-loop circuitry to lock into a system time clock (STC) from a program clock reference, or PCR, received in the bitstream to facilitate decoding and output operations. Although described in the context of hardware circuitry, some embodiments of the clock circuit 218 may be configured as software (e.g., virtual clocks) or a combination of hardware and software. Further, in some embodiments, the clock circuit 218 is programmable.

The VSRP device 200 may further comprise a storage device 220 (and associated control logic as well as one or more drivers in memory 222) to temporarily store buffered media content and/or more permanently store recorded media content. The storage device 220 may be coupled to the bus 205 via an appropriate interface (not shown), as should be understood by one having ordinary skill in the art.

Memory 222 in the VSRP device 200 comprises volatile and/or non-volatile memory, and is configured to store executable instructions or code associated with an operating system (O/S) 224 and other applications, and one or more applications 226 (e.g., interactive programming guide (IPG), video-on-demand (VOD), personal video recording (PVR), WatchTV (associated with broadcast network TV), among other applications not shown such as pay-per-view, music, driver software, etc.).

Further included in one embodiment in memory 222 is video processing (VP) logic 228, which in one embodiment is configured in software. In some embodiments, VP logic 228 may be configured in hardware, or a combination of hardware and software. The VP logic 228, in cooperation with the processor 216, is responsible for interpreting assistance information and providing the appropriate settings for a display and output system 230 of the VSRP device 200. In some embodiments, functionality of the VP logic 228 may reside in another component within or external to memory 222 or be distributed among multiple components of the VSRP device 200 in some embodiments.

The VSRP device 200 is further configured with the display and output logic 230, as indicated above, which includes one or more output systems (e.g., configured as HDMI, DENC, or others well-known to those having ordinary skill in the art) 233 to process the decoded pictures and provide for presentation (e.g., display) on display device 140. Though shown conceptually in FIG. 2 as an entity separate from the media engine 206, in some embodiments, one or more of the functionality of the display and output logic 230 may be incorporated in the media engine 206 (e.g., on a single chip) or elsewhere in some embodiments.

A communications port 234 (or ports) is (are) further included in the VSRP device 200 for receiving information from and transmitting information to other devices. For instance, the communication port 234 may feature USB (Universal Serial Bus), Ethernet, IEEE-1394, serial, and/or parallel ports, etc. The VSRP device 200 may also include one or more analog video input ports for receiving and/or transmitting analog video signals.

One having ordinary skill in the art should understand that the VSRP device 200 may include other components not shown, including decryptors, samplers, digitizers (e.g., analog-to-digital converters), multiplexers, conditional access processor and/or application software, driver software, Internet browser, among others. Further, though the VP logic 228 is illustrated as residing in memory 222, it should be understood that all or a portion of such logic 228 may be incorporated in, or distributed among, the media engine 206, the display and output system 230, or elsewhere. Similarly, in some embodiments, functionality for one or more of the components illustrated in, or described in association with, FIG. 2 may be combined with another component into a single integrated component or device.

The VP system (e.g., encoder 111, splicer 112, decoding logic (e.g., media engine 206), and/or display and output logic 230) may be implemented in hardware, software, firmware, or a combination thereof. To the extent certain embodiments of the VP system or a portion thereof are implemented in software or firmware (e.g., including the VP logic 228), executable instructions for performing one or more tasks of the VP system are stored in memory or any other suitable computer readable medium and executed by a suitable instruction execution system. In the context of this document, a computer readable medium is an electronic, magnetic, optical, or other physical device or means that can contain or store a computer program for use by or in connection with a computer related system or method.

To the extent certain embodiments of the VP system or portions thereof are implemented in hardware, the VP system may be implemented with any or a combination of the following technologies, which are all well known in the art: a discreet logic circuit(s) having logic gates for implementing logic functions upon data signals, an application specific integrated circuit (ASIC) having appropriate combinational logic gates, programmable hardware such as a programmable gate array(s) (PGA), a field programmable gate array (FPGA), etc.

Having addressed certain embodiments of VP systems that decode the coded pictures of a bitstream, attention is directed to the use of the assistance information (or a separate and distinct piece of assistance information in some embodiments) to assist the affecting of trick mode functionality. An output clock (e.g., a clock residing in the clocking circuit 218 or elsewhere) residing in the VSRP device 200 drives the output of reconstructed pictures (e.g., with an output system 233 configured as HDMI or a DENC or other known output systems). The display and output logic 230 may operate in one of plural modes. In one mode, often referred to as passthrough mode, the VSRP device 200 behaves intelligently, providing an output picture format corresponding to the picture format determined upon the acquisition or start of a video service (such as upon a channel change) in union with the format capabilities of the display device 140 and user preferences. In a fixed mode (or also referred to herein as a non-passthrough mode), the output picture format is fixed by user input or automatically (e.g., without user input) based on what the display device 140 supports (e.g., based on interrogation by the set-top box of display device picture format capabilities).

In one embodiment, the splicer 112 and/or encoder 111 deliver assistance information for reception and processing by the display and output logic 230, the assistance information conveying to the display and output logic 230 information to affect certain behavior to provide the requested trick mode, wherein the assistance information pertains to picture interdependencies related by successive tier numbers output of the decoded pictures. In some embodiments a part of the assistance information may be provided according to a different mechanism or via a different channel or medium.

Figure 3:
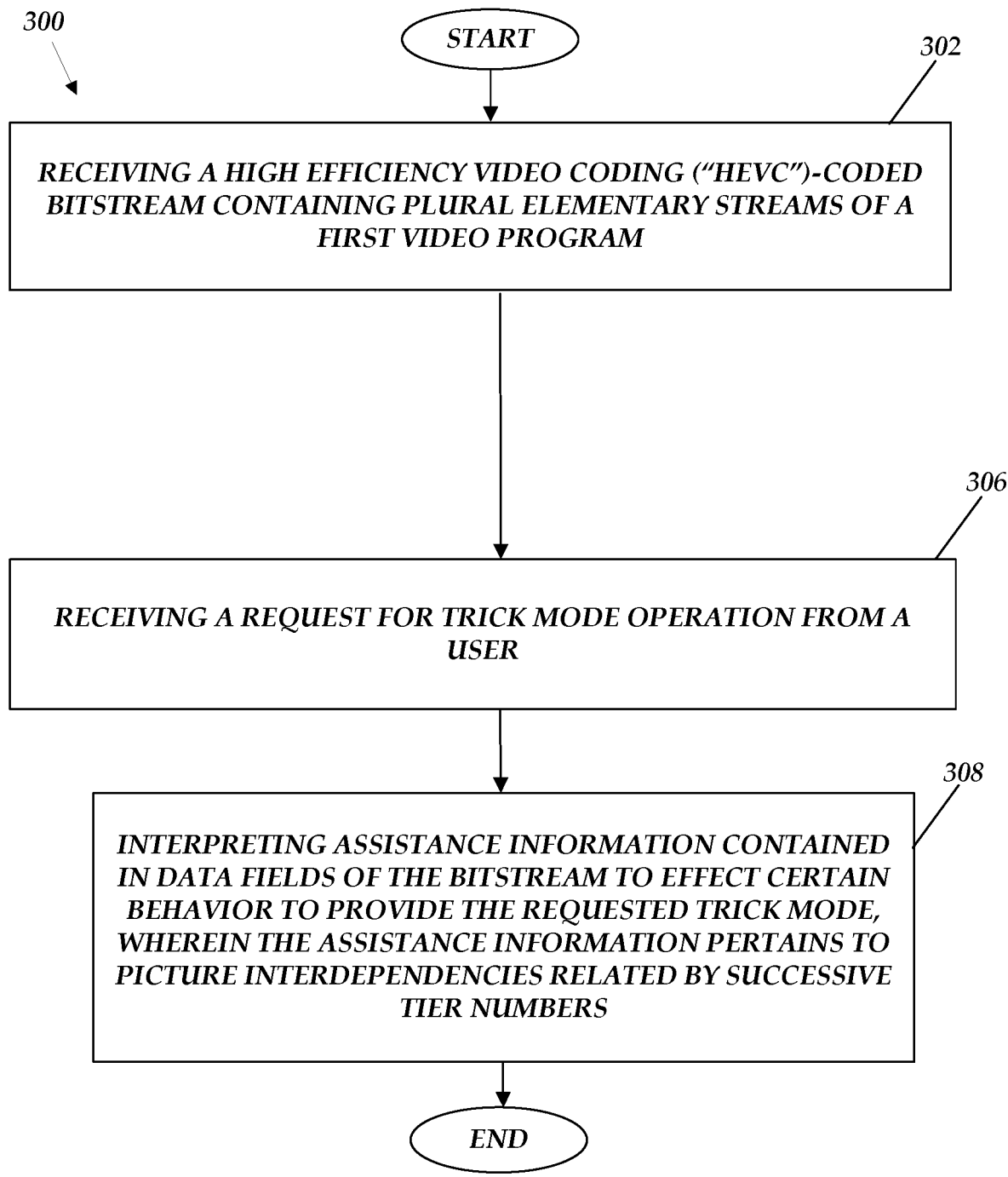
FIG. 3 is a flow diagram that illustrates one example method embodiment to process video comprising assistance information.

Having described various embodiments of VP systems, it should be appreciated that one VP method embodiment 300, implemented at a VSRP device 200 and illustrated in FIG. 3, can be broadly described by receiving a High Efficiency Video Coding ("HEVC")-coded bitstream containing plural elementary streams of a first video program (302); receiving a request for trick mode operation from a user (306); and interpreting assistance information contained in data fields of the bitstream to affect certain behavior to provide the requested trick mode, wherein the assistance information pertains to picture interdependencies related by successive tier numbers (308). In an alternate embodiment, a user interface may be presented to a viewer providing options to control trick mode functionality. The user may invoke a trick mode operation from a remote control or other input device serving as the user interface. In another embodiment, the user interface includes displayed visual information.

In some embodiments, the assistance information may affect certain behavior to provide the requested trick mode in one of a PVR application or a VOD application. For example, a user may be viewing a movie through a VOD application and request fast reverse playback to return to a previous scene. The capabilities of the fast reverse playback mode may be affected by the received assistance information which determines by tier numbers a subset of pictures to extract for the desired trick mode.

In some embodiments, the assistance information is located at the start of each video access unit. For example, the assistance information may be non-encrypted and may be contained in a plurality of adaptation fields. In some embodiments, the assistance information may further comprise a flag signaled at each RAP picture to signal whether trick mode functionality is blocked.

During various playback modes, decoding may be started at a RAP picture to begin the extraction of a self-decodable substream. An AU associated with the RAP picture may further comprise one video parameter set, one active sequence parameter set with video usability information, and at least one picture parameter set required to decode the picture. In some embodiments, the RAP picture may correspond to one of: Instantaneous Decoding Refresh, Broken Link Access, or Clean Random Access.

In some embodiments, a Random Access Skipped Leading picture immediately following the RAP picture is not decoded if the RAP picture has a NAL unit type equal to BLA_W_LP or a NAL unit type equal to CRA_NUT. In such a scenario, a handleCRAasBLA flag may be set equal to 1 and a NoRASLOutputFlag flag may be set equal to the handleCRAasBLA if the RAP picture has a NAL unit type equal to CRA_NUT.

In some embodiments, assistance information pertains to picture interdependencies related by successive tier numbers. The tier numbers may describe signaling for extractable and decodable sub-sequences based on picture interdependencies for picture selection during the requested trick mode. The tier numbers may be successive such that any picture with a tier number N does not depend directly or indirectly on any picture with a tier number greater than N.

In some embodiments, the lowest available tier number may be assigned to all RAP pictures. Furthermore, all pictures associated with the lowest available tier number may be RAP pictures. For example, a tier number M may be designated as a largest tier number assignable to reference pictures intended to be extracted in trick mode. Consequently tier numbers greater than M may be designated as assignable to pictures deemed discardable during the requested trick mode.

Another VP method embodiment according to the present disclosure, implemented at a VSRP device 200, can be broadly described by decoding a HEVC bitstream in response to a user request of trick mode operation starting at a RAP picture that is not a RASL picture and is of a tier equal to K, wherein the RAP picture is decodable if all immediately preceding pictures in tiers 0 to K have been decoded, wherein tier information is contained in PVR assistance information provided in data field of the bitstream.

In some embodiments, a NAL unit header for each NAL unit in an AU from the bitstream may specify a temporal identifier for the respective NAL unit. In one example, the temporal identifier may be 0 for all RAP pictures in the bitstream and a maximum temporal identifier may be equal to a value in an associated sequence parameter set indicative of a maximum number of sublayers −1.

Figure 4:
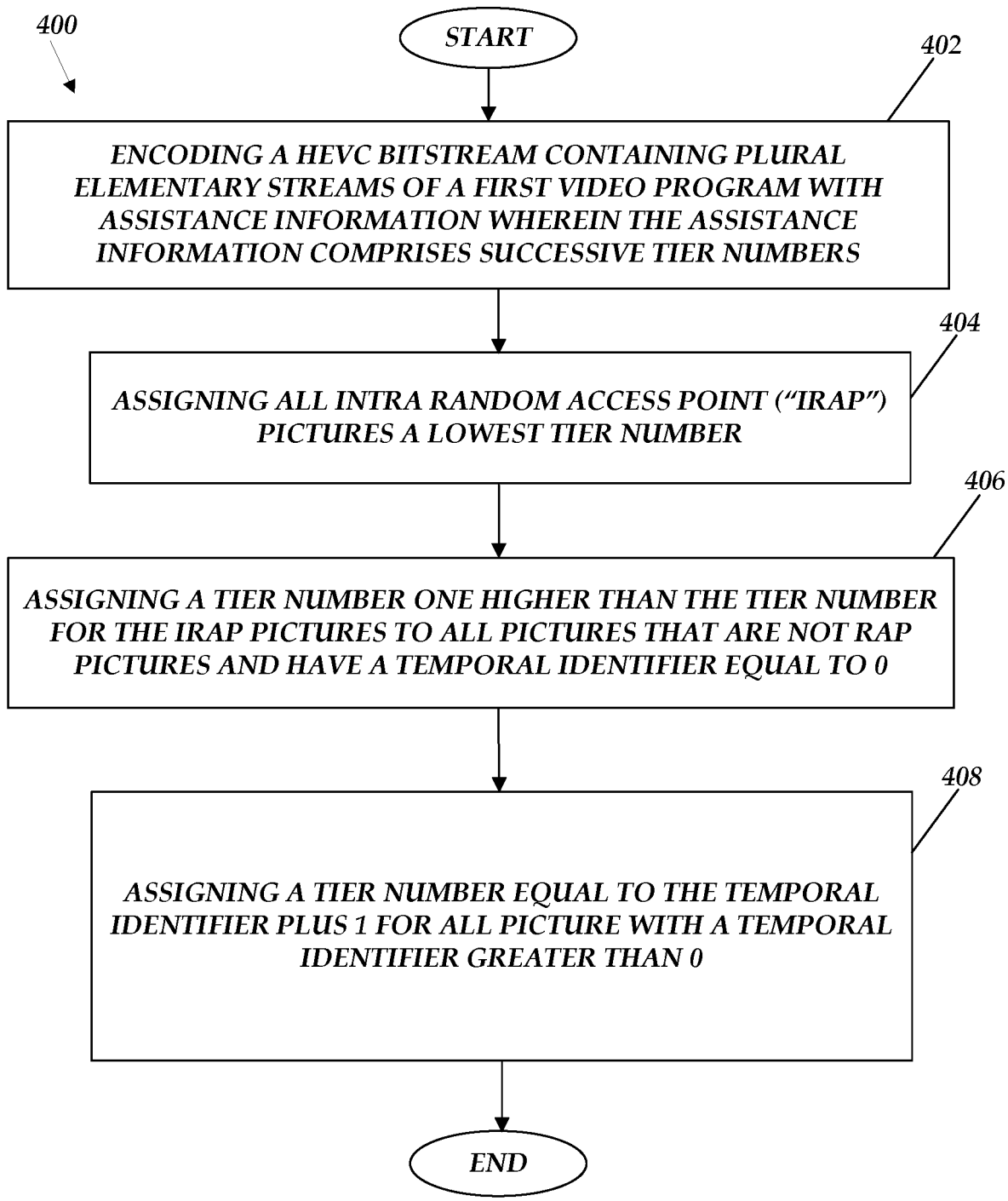
FIG. 4 is a flow diagram that illustrates one example method embodiment to process video comprising assistance information.

A further VP method embodiment 400, implemented at a device, such as headend 110 and illustrated in FIG. 4, can be broadly described by encoding a HEVC bitstream containing plural elementary streams of a first video program with assistance information wherein the assistance information comprises successive tier numbers (402); assigning all Intra Random Access Point ("IRAP") pictures a lowest tier number (404); assigning a tier number one higher than the tier number for the IRAP pictures to all pictures that are not RAP pictures and have a temporal identifier equal to 0 (406); and assigning a tier number equal to the temporal identifier plus 1 for all picture with a temporal identifier greater than 0 (408). In some embodiments, a highest tier number may be assigned to all non-reference pictures with value from an associated sequence parameter set indicative of a maximum number of sublayers −1. In some embodiments, the lowest tier number may be 0 and the highest tier number may be 7.

In view of the above description, it should be appreciated that other VP method and/or system embodiments are contemplated. For instance, one VP method embodiment may be implemented upstream of the VSRP device (e.g., at the headend 110). In such an embodiment, the encoder 111 or splicer 112 may implement the steps of providing a transport stream comprising a bitstream that includes assistance information to affect certain behavior to provide the requested trick mode, wherein the assistance information pertains to picture interdependencies related by successive tier numbers. Other embodiments are contemplated as well.

Any process descriptions or blocks in flow charts or flow diagrams should be understood as representing modules, segments, or portions of code which include one or more executable instructions for implementing specific logical functions or steps in the process, and alternate implementations are included within the scope of the present disclosure in which functions may be executed out of order from that shown or discussed, including substantially concurrently or in reverse order, depending on the functionality involved, as would be understood by those reasonably skilled in the art. In some embodiments, steps of processes identified in FIGS. 3 and 4 using separate boxes can be combined. Further, the various steps in the flow diagrams illustrated in conjunction with the present disclosure are not limited to the architectures described above in association with the description for the flow diagram (as implemented in or by a particular module or logic) nor are the steps limited to the example embodiments described in the specification and associated with the figures of the present disclosure. In some embodiments, one or more steps may be added to the methods described in FIGS. 3 and 4, either in the beginning, end, and/or as intervening steps, and that in some embodiments, fewer steps may be implemented.

It should be emphasized that the above-described embodiments of the present disclosure are merely possible examples of implementations, merely set forth for a clear understanding of the principles of the VP systems and methods. Many variations and modifications may be made to the above-described embodiment(s) without departing substantially from the spirit and principles of the disclosure. Although all such modifications and variations are intended to be included herein within the scope of this disclosure and protected by the following claims, the following claims are not necessarily limited to the particular embodiments set out in the description.

What is claimed is:

1. A method comprising:
receiving a user request for a trick mode operation;
decoding a High Efficiency Video Coding (HEVC) bitstream in response to the user request for the trick mode operation starting at a Random Access Point (RAP) picture that is not a Random Access Skipped Leading (RASL) picture and is of a tier equal to K where K is an integer, wherein the RAP picture is decodable if all immediately preceding pictures in tiers 0 to K have been decoded, and wherein tier information is contained in Personal Video Recording (PVR) assistance information provided in data filed of the bitstream;
extracting, based on the tier information, reference pictures from the decoded HEVC stream; and
providing, based on the reference pictures, the requested trick mode.

2. The method of claim 1, wherein a Network Abstraction Layer (NAL) unit header for each NAL unit in an Access Unit (AU) from the bitstream specifies a temporal identifier for the respective NAL unit.

3. The method of claim 2, wherein the temporal identifier is 0 for all RAP pictures in the bitstream and wherein a maximum temporal identifier is equal to a value in an associated sequence parameter set indicative of a maximum number of sublayers −1.

4. The method of claim 1, wherein the lowest tier number is 0 and the highest tier number is 7.

5. The method of claim 1, wherein the PVR assistance information affects certain behavior to provide the requested trick mode in one of a personal video recording application and a video on demand application.

6. The method of claim 5, wherein the PVR assistance information is located at the start of each video access unit.

7. The method of claim 6, wherein the PVR assistance information is non-encrypted and is contained in a plurality of adaptation fields.

8. A system comprising:
a memory storage; and
a processing unit coupled to the memory storage, wherein the processing unit is operative to:
receive a user request for a trick mode operation;
decode a High Efficiency Video Coding (HEVC) bitstream in response to the user request for the trick mode operation starting at a Random Access Point (RAP) picture that is not a Random Access Skipped Leading (RASL) picture and is of a tier equal to K where K is an integer, wherein the RAP picture is decodable if all immediately preceding pictures in tiers 0 to K have been decoded, and wherein tier information is contained in Personal Video Recording (PVR) assistance information provided in data filed of the bitstream;
extract, based on the tier information, reference pictures from the decoded HEVC stream; and
provide, based on the reference pictures, the requested trick mode.

9. The system of claim 8, wherein a Network Abstraction Layer (NAL) unit header for each NAL unit in an Access Unit (AU) from the bitstream specifies a temporal identifier for the respective NAL unit.

10. The system of claim 9, wherein the temporal identifier is 0 for all RAP pictures in the bitstream and wherein a maximum temporal identifier is equal to a value in an associated sequence parameter set indicative of a maximum number of sublayers −1.

11. The system of claim 8, wherein the lowest tier number is 0 and the highest tier number is 7.

12. The system of claim 8, wherein the PVR assistance information affects certain behavior to provide the requested trick mode in one of a personal video recording application and a video on demand application.

13. The system of claim 12, wherein the PVR assistance information is located at the start of each video access unit.

14. The system of claim 13, wherein the PVR assistance information is non-encrypted and is contained in a plurality of adaptation fields.

15. A non-transitory computer-readable medium that stores a set of instructions which when executed perform a method executed by the set of instructions comprising:
   receiving a user request for a trick mode operation;
   decoding a High Efficiency Video Coding (HEVC) bitstream in response to a user request of trick mode operation starting at a Random Access Point (RAP) picture that is not a Random Access Skipped Leading (RASL) picture and is of a tier equal to K where K is an integer, wherein the RAP picture is decodable if all immediately preceding pictures in tiers 0 to K have been decoded, and wherein tier information is contained in Personal Video Recording (PVR) assistance information provided in data filed of the bitstream;
   extracting, based on the tier information, reference pictures from the decoded HEVC stream; and
   providing, based on the reference pictures, the requested trick mode.

16. The non-transitory computer-readable medium of claim 15, wherein a Network Abstraction Layer (NAL) unit header for each NAL unit in an Access Unit (AU) from the bitstream specifies a temporal identifier for the respective NAL unit.

17. The non-transitory computer-readable medium of claim 16, wherein the temporal identifier is 0 for all RAP pictures in the bitstream and wherein a maximum temporal identifier is equal to a value in an associated sequence parameter set indicative of a maximum number of sublayers −1.

18. The non-transitory computer-readable medium of claim 15, wherein the lowest tier number is 0 and the highest tier number is 7.

19. The non-transitory computer-readable medium of claim 15, wherein the PVR assistance information affects certain behavior to provide the requested trick mode in one of a personal video recording application and a video on demand application.

20. The non-transitory computer-readable medium of claim 19, wherein the PVR assistance information is located at the start of each video access unit.

* * * * *